Figure 7:
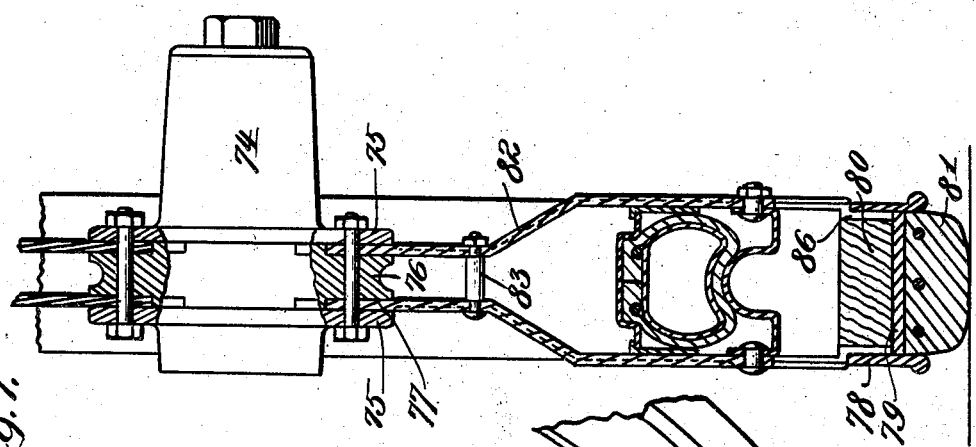

No. 842,709. PATENTED JAN. 29, 1907.
J. C. RUTHERFORD.
VEHICLE WHEEL.
APPLICATION FILED JAN. 15, 1906.
3 SHEETS—SHEET 1.
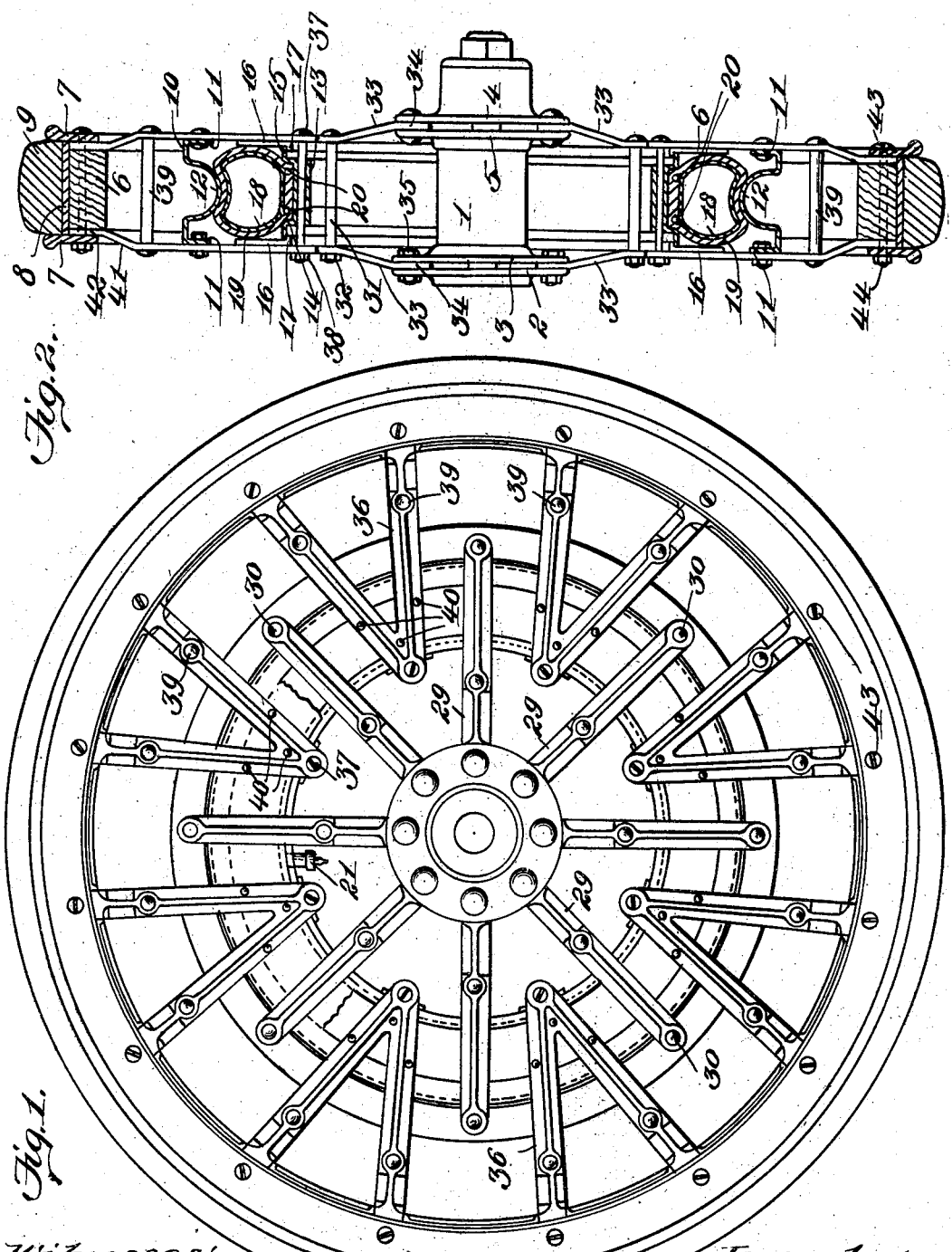

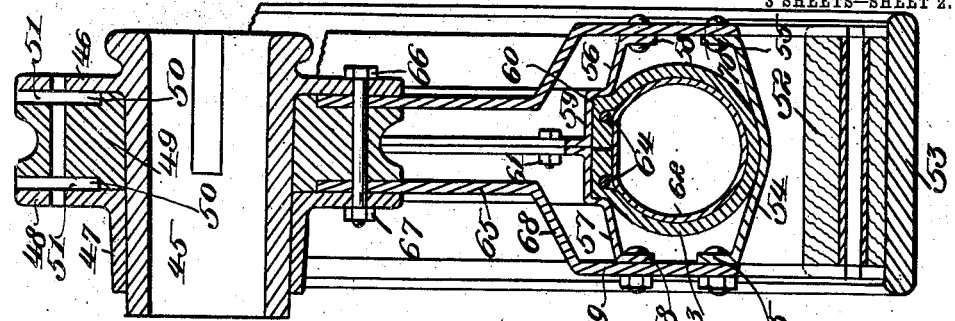

No. 842,709. PATENTED JAN. 29, 1907.
J. C. RUTHERFORD.
VEHICLE WHEEL.
APPLICATION FILED JAN. 15, 1906.

3 SHEETS—SHEET 3.

Witnesses:
G. D. Kesler
Ernest E. Weaver

Inventor
John C. Rutherford
By James L. Norris
Atty

UNITED STATES PATENT OFFICE.

JOHN C. RUTHERFORD, OF NEW YORK, N. Y.

VEHICLE-WHEEL.

No. 842,709.　　　　Specification of Letters Patent.　　　　Patented Jan. 29, 1907.

Application filed January 15, 1906. Serial No. 296,205.

*To all whom it may concern:*

Be it known that I, JOHN C. RUTHERFORD, a citizen of the United States, residing at New York, in the county of New York and State of New York, have invented new and useful Improvements in Vehicle-Wheels, of which the following is a specification.

This invention relates to vehicle-wheels, more particularly adapted for use in connection with motor-vehicles; and the object thereof is to construct a wheel embodying all the advantages of a pneumatic or cushion wheel and which is tired with any suitable material, as hereinafter set forth, so as to prevent the puncturing, injuring, and wearing out of the cushion, whether said cushion be a solid or a pneumatic one, and by such arrangement longevity is obtained for the wheel.

The invention further aims to construct an iron, rubber, or composition tired cushion-wheel for vehicles, more particularly motor-vehicles, which shall be simple in its construction, strong, durable, having a cushioning effect, efficient in its use, comparatively inexpensive to manufacture, and convenient to set up.

With the foregoing and other objects in view the invention consists of the novel construction, combination, and arrangement of parts hereinafter more specifically described, and illustrated in the accompanying drawings, which form a part of this specification, and wherein is shown the preferred embodiment of a vehicle-wheel constructed in accordance with this invention; but it is to be understood that changes, variations, and modifications can be resorted to which come within the scope of the claims hereunto appended.

In describing the invention in detail, reference is had to the accompanying drawings, wherein like reference characters denote corresponding parts throughout the several views, and in which—

Figure 6:
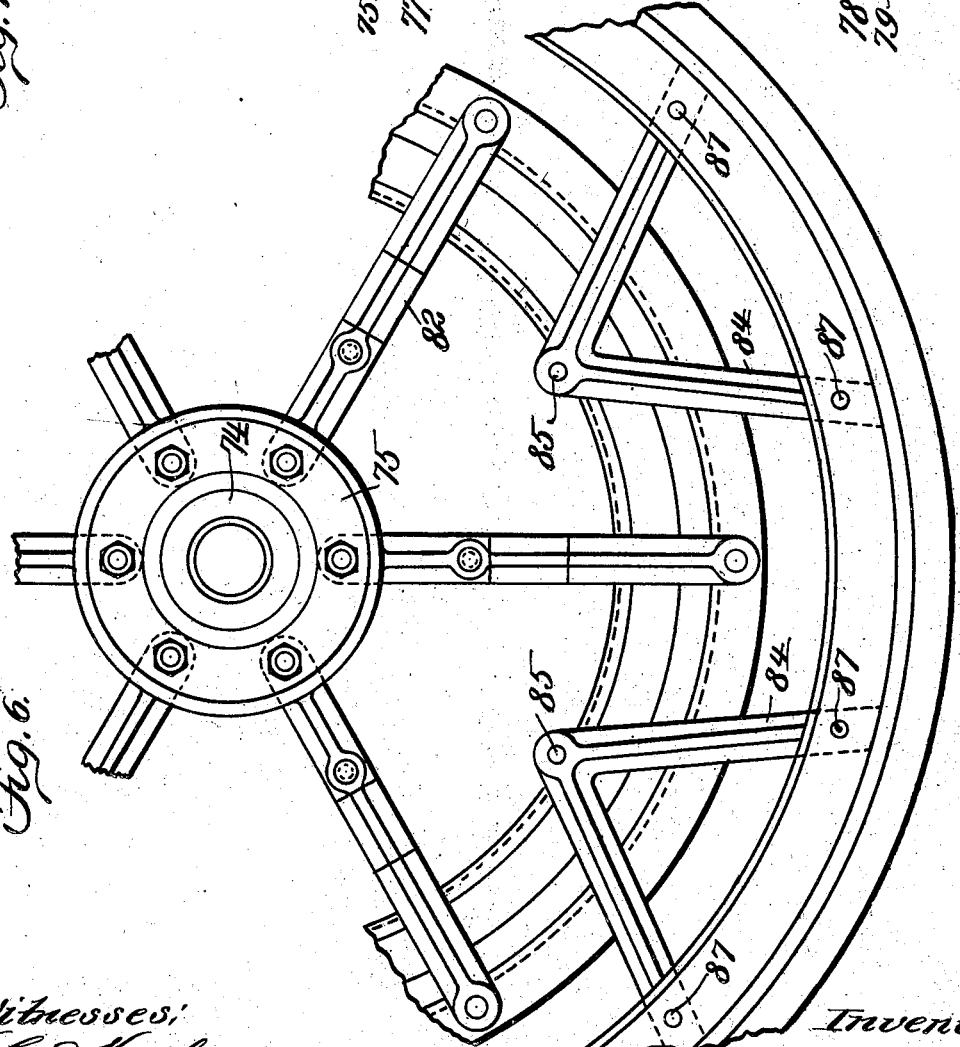

Figure 1 is a side elevation, partly broken away, of a vehicle-wheel in accordance with this invention. Fig. 2 is a vertical sectional view thereof. Fig. 3 is a sectional detail showing the means for securing the cushion in position. Figs. 4 and 5 are respectively a side elevation and a vertical section of a modified form, partly broken away; and Figs. 6 and 7 are like views of another modified form.

A vehicle-wheel constructed in accordance with this invention embodies what is termed a "hub-section," a "tire-section," an "inner" set of spokes, an "outer" set of spokes, and a "cushioning-section" engaged and retained in position by the two sets of spokes, connected with the tire-section and with the hub-section and interposed between the tire-section and the hub-section.

Referring to Figs. 1 and 2 of the drawings, the hub-section is indicated by the reference character 1 and is formed with two pairs of annular flanges, the flanges of one pair being indicated by the reference characters 2 3 and the flanges of the other pair by the reference characters 4 5. The pair of flanges 2 3 are formed at the inner end of the hub-section and the pair of flanges 4 5 near the outer end of the hub-section.

The tire-section comprises a rim 6, against each side of which is positioned a rim-band 7 of greater width than the rim 6, and upon the rim 6 is mounted a supporting-ring 8, and between the rim-bands 7 and upon the ring 8 is positioned the tire 9, which may be of any suitable material, but as shown consists of a suitable composition—for example, rubber. The ring 8 and tire 9 are clamped between the rim-band 7 in a manner as hereinafter referred to. The manner of connecting the outer set of spokes to the tire-section will be hereinafter referred to.

The cushioning-section consists of an outer rim member 10, which is bent inwardly at each side, as at 11, and has the central portion depressed, as at 12, said central portion being substantially semi-elliptical in cross-section, and said rim member 10 constitutes the outer retaining element for the cushioning element of the cushioning-section. The cushioning-section, furthermore, comprises an inner retaining element for the cushioning element, and said inner retaining element consists of a collar 13, cut away, as at 14, to form a seat for the cushioning element, and said collar 13 is flanged, as at 15, for engaging the protecting side bands 16 for the cushioning element. The protecting side bands are shouldered, as at 17, to form seats for the flanges 15. The cushioning element comprises an inner inflatable tube 18, an outer protecting-tube 19, and a pair of holding-wires 20, which engage the tube 19. The inner portion of the tube 19 is adapted to be positioned in the seat 14 of the collar 13.

The depressed portion of the rim 12 is adapted to engage the periphery of the tube 19 at the outer portion thereof, and the bands 16 are adapted to engage the periphery of the tube 19 at the sides thereof. When the inner tube 18 is inflated, an inlet valve and nipple 21 being provided for such purpose, the tube 19 is expanded so that it will engage the bands 16 and the depressed portion 12 of the outer retaining element 10. Consequently the cushioning element will be clamped between the inner and the outer retaining elements and the bands 16. The cushioning element is also secured to the outer retaining element and the inner retaining element. By way of an example, a means for securing the cushioning element to said retaining elements is shown in Fig. 3. Said means consists of an inverted-V-shaped bolt 22, which extends through the depressed portion 12 and the tube 19 and has the head 23 interposed between the tube 18 and the tube 19. The head 23 is curvilinear in contour, and the outer end of the bolt 22 is screw-threaded to receive a holdfast device 24. Interposed between the holdfast device 24 and the outer face of the depressed portion 12 is a segment-shaped washer 25. Said means further comprises a T-shaped bolt 26, which extends through the collar 13 and tube 19 and has the head 27 thereof interposed between the tube 18 and the tube 19. The head 27 is flat and engages the wires 20, and the outer end of the bolt 26 is screw-threaded to receive a holdfast device 28. Any desired number of bolts 22 and 26 may be employed.

Each of the spokes of the inner set of spokes is indicated by the reference character 29 and has the outer end thereof secured through the medium of a holdfast device 30 to an inwardly-extending portion of the outer retaining element of the cushioning section. The inner set of spokes is arranged on each side of the wheel, as illustrated in Fig. 2, and the inner spokes on one side of the wheel are arranged in parallelism with the inner spokes on the other side of the wheel, and each pair of the inner spokes which extends in parallelism with respect to each other is connected together by a headed stay-bolt 31, carrying a holdfast device 32. Each of the spokes 29 of the inner set is provided with an outwardly-extending inclined portion 33, which terminates in a straight end portion 34, said straight end portion 34 extending between a pair of the flanges 2 3 or 4 5, as the case may be, and the said end portion 34 is secured to its respective pair of flanges through the medium of the holdfast devices 35. By setting up the inner spokes in the manner as stated the hub is connected with the outer retaining member of the cushioning element.

Each of the spokes of the outer set of spokes is indicated by the reference character 36. Each of the spokes 36 is preferably V-shaped in contour, and these spokes are arranged on opposite sides of the wheel, the outer spokes on one side of the wheel being arranged in parallelism with the outer spokes on the other side of the wheel, and the inner ends of each pair of outer spokes are connected to the collar 13 through the medium of a stay-bolt 37, which extends through said collar 13 and the ends of the spokes, and the said stay-bolt 37 carries a holdfast device 38. By such an arrangement the outer spokes are connected to the inner retaining element of the cushioning-section. Each pair of spokes 36 is also connected together by a pair of stay-bolts 39 and also secured by the holdfast devices 40 to the band 16. The outer portions of each of the spokes 36 extend inwardly at an inclination, as at 41, which terminates in the straight end portions 42, the latter extending into suitable grooves formed in the sides of the rim 6, so that the said end portions 42 will be positioned between the rim-bands 7 and the sides of the rim 6. The end portions 42 of the spokes 36 are secured to the rim 6 and rim-bands 7 by the stay-bolts 43, which extend through the rim-bands 7 and rim 6 and carry the holdfast devices 44. The stay-bolts 43 and holdfast devices 44 also act as a means for clamping the rim-bands 7, rim 6, ring 8, and tire 9 together. It will be evident from the manner of setting up the outer set of spokes that the tire-section is connected with the inner retaining element of the cushioning-section.

It will be evident from the foregoing construction that when the wheel is used the wear will come upon the tire 9, which is more serviceable than the ordinary pneumatic or solid-rubber tires; but at the same time, owing to the employment of the cushioning-section in the manner as set forth, the wheel embodies all the advantages of the ordinary cushion-tire.

In the construction shown in Figs. 4 and 5 the hub-section is indicated by the reference character 45 and is provided at one end with an annular flange 46, projecting from the periphery thereof, and said hub-section further comprises a collar 47, which is mounted upon the hub 45 and which is formed at one end with a flange 48 of the same width as the flange 46 and opposes the said flange 46. Interposed between the flanges 46 and 48 is a collar 49, cut away on each side, as at 50, so as to form, in connection with the flanges 46 48, the recesses 51, for a purpose to be hereinafter referred to. The tire-section consists of the rim or felly 52 and the iron tire 53. The cushioning-section consists of an outer retaining element 54 in the form of a band, which is substantially arch-shaped in cross-section and provided with inturned sides, as at 55. Said cushioning-section further comprises an inner retaining element formed of two members 56 57, each of which is provided with an inturned side 58 and with an inner portion formed in an angular manner, as at 59, so as to constitute a seat 60 for the cushioning element. The sections 56 57 are connected together by the holdfast devices 61. The cushioning element consists of an inner inflatable tube 62 and an outer tube 63, the latter being retained in the seat 60 through the medium of the holding-wires 64.

Each of the spokes of the inner set of spokes is indicated by the reference character 65, and the inner portions of said spokes 65 extend into the recesses 51 and are secured to the flanges 46 48 and the collar 49 through the medium of the bolts 66, which extend through the inner end of the spokes 65, the collar 49, flanges 46 and 48 and carry the holdfast devices 67. The bolts 66 also act as a means for clamping the flanges 46 and 48 and collar 49 together. Each of the spokes 65 is provided with an outwardly-extending inclined portion 68, which terminates in a straight portion 69, the straight portion 69 of the spokes 65 having the ends thereof fixedly secured to the inturned sides 55 of the outer retaining element 54 of the cushioning-section through the medium of the holdfast devices 70. Each of the spokes of the outer set of spokes is substantially V-shaped in contour and is indicated by the reference character 71 and has the inner end thereof secured, through the medium of the holdfast devices 72, to the inturned sides 58 of the inner retaining element 57 of the cushioning-section. The outer ends of each of the spokes 71 are mounted in recesses formed in the rim or felly 52 and secured to the rim or felly 52 through the medium of the holdfast devices 73. From the foregoing construction it is evident that the tire-section is connected to the inner retaining element 57 of the cushioning-section and the hub-section is connected to the outer retaining element 54 of the cushioning-section, and it is also evident that the construction illustrated in Figs. 4 and 5 obtains the same function and advantages as the construction in Figs. 1, 2, and 3. A suitable means may be employed for inflating the cushioning element of the cushioning-section, and, if desired, the means shown in Fig. 3 for connecting the cushioning element to the outer and inner retaining elements of the cushioning-section may be employed.

In Figs. 6 and 7 the hub-section comprises a hub 74, formed with a pair of peripheral flanges 75, suitably spaced apart, and interposed between said flanges 75 is a collar 76, having the sides thereof cut away so as to form, in connection with the flanges, the recesses 77, for a function to be hereinafter referred to. The tire-section comprises a pair of rim-bands 78, a supporting-ring 79, a rim 80, and a tire 81, of any suitable material. The cushioning-section is constructed substantially the same as that shown in Fig. 1. The inner spokes 82 are constructed substantially the same as that shown in Figs. 4 and 5, with the exception that they are connected together by stay-bolts 83. The inner spokes 82 are set up and secured in the same manner as that shown in Figs. 4 and 5. The outer spokes are indicated by the reference character 84, are V-shaped in contour, connected to the cushioning-section by the holdfast devices 85, bent inwardly, as at 86, then extend between the rim-bands 78 and rim 80 and secured by the holdfast devices 87. The holdfast devices 87 also act as a means for clamping the rim-bands 78, the rim 80, ring 79, and tire 81 together.

One of the main advantages derived from a vehicle constructed in accordance with this invention is that the weight of the car or vehicle is suspended on the upper half of the pneumatic tube instead of resting upon a few inches of the tube on the ground, thereby increasing the life of the cushioning element or tube, which would not be the case if the weight of the car or vehicle was not suspended in the manner as stated, and such fact also tends to materially assist in obtaining the cushioning function of the wheel, as will be evident.

Having thus fully described my invention, what I claim as new, and desire to secure by Letters Patent, is—

1. A vehicle-wheel embodying a tire-section, a hub-section, a cushioning-section interposed between the hub and tire sections, spokes connected at one end to the hub-section and to the cushioning-section, and V-shaped spokes having their apex connected to the cushioning-section and their ends to the tire-section.

2. A wheel of the character described, comprising the combination with a hub-section and a tire-section, of a cushioning-section comprising a cushioning element interposed between an outer and an inner retaining element, said outer and inner retaining elements having inturned sides, spokes connected at one end to the hub portion and to the inturned sides of the outer retaining element, and V-shaped spokes having the apex thereof connected to the inturned sides of the inner retaining element and their ends connected to the tire-section.

3. A wheel of the character described, comprising the combination with a hub-section and a tire-section, of a cushioning-section comprising a cushioning element interposed between an outer and an inner retaining element, said outer and inner retaining elements having inturned sides, spokes connected at one end to the hub portion and to the inturned sides of the outer retaining element, and V-shaped spokes having the apex thereof connected to the inturned sides of the inner retaining element, and having their ends extending into and connected to the tire-section.

4. A wheel of the character described, comprising a cushioning-section suitably connected with the tire and hub of the wheel, said section comprising a cushioning element formed of an inflatable tube and a covering therefor, an inner and an outer retaining element for said cushioning element, holdfast devices between said inner and outer retaining elements and said covering, and protecting-bands for said covering, said bands associating with said inner retaining element.

5. A wheel of the character described, comprising a tire-section, a hub-section, a cushioning-section interposed between the tire and the hub sections, an inner set of spokes arranged at each side of the wheel and connected at one end to the hub-section and at its other end to said cushioning-section, stay-bolts for said spokes, a set of outer spokes arranged at each side of the wheel and connected at one end to said cushioning element and at their other end to said tire-section, and stay-bolts for said outer set of spokes.

6. A wheel of the character described, comprising a tire-section, a hub-section, a cushioning-section interposed between the tire and the hub sections, an inner set of spokes arranged at each side of the wheel and connected at one end to the hub-section and at their other end to said cushioning-section, stay-bolts for said spokes, and an outer set of V-shaped spokes arranged at each side of the wheel and having the apex thereof connected to said cushioning-section and the ends thereof extending into and secured to said tire-section.

7. A wheel of the character described, comprising a tire-section, a hub-section, a cushioning-section interposed between the tire and the hub sections, an inner set of spokes arranged at each side of the wheel and connected at one end to the hub-section and at its other end to said cushioning-section, stay-bolts for said spokes, an outer set of V-shaped spokes arranged at each side of the wheel and having the apex thereof connected to said cushioning-section and the ends thereof extending into and secured to said tire-section, and stay-bolts for said outer set of spokes interposed between the tire-section and the cushioning-section.

8. A wheel of the character described, comprising a tire-section, a hub-section, a cushioning-section interposed between the hub and the tire sections, an inner set of spokes arranged at each side of the wheel and connected at one end to the outer side of said cushioning-section and at their other end to the hub-section, stay-bolts for said spokes arranged at a point between the inner side of the cushioning-section and said hub-section, an outer set of spokes connected at one end to the inner side of said cushioning-section and at their other end to said tire-section, and stay-bolts for said outer set of spokes arranged at a point between said outer side of said cushioning-section and the said tire-section.

9. A wheel of the character described, comprising the combination with a hub and a tire section, of a cushioning-section interposed between the hub and the tire section, said cushioning-section comprising an inner retaining element provided with a seat, a cushioning element mounted in said seat, and an outer retaining element provided with a depressed portion adapted to engage said cushioning element, each of said retaining elements provided with inturned sides, combined with means secured to said inturned sides and to the tire and hub sections for suitably connecting the cushioning-section thereto.

10. A wheel of the character described, comprising the combination with a hub and a tire section, of a cushioning-section interposed between the hub and the tire section, said cushioning-section comprising an inner retaining element provided with a seat, a cushioning element mounted in said seat, and an outer retaining element provided with a depressed portion adapted to engage said cushioning element, each of said retaining elements provided with inturned sides, combined with means secured to said inturned sides and to the tire and hub sections for suitably connecting the cushioning-section thereto, and protecting-bands for the cushioning-section.

In testimony whereof I have hereunto set my hand in presence of two subscribing witnesses.

J. C. RUTHERFORD.

Witnesses:
JAMES A. DEMPSEY,
EUGENE S. WATSON.